US009741009B2

(12) United States Patent
Berghorn et al.

(10) Patent No.: US 9,741,009 B2
(45) Date of Patent: Aug. 22, 2017

(54) TRANSFER SYSTEM AND MATERIAL-HANDLING SYSTEM AND METHOD USING SUCH TRANSFER SYSTEM

(71) Applicant: Dematic Corp., Grand Rapids, MI (US)

(72) Inventors: David M. Berghorn, Grand Rapids, MI (US); Michael S. Khodl, Ada, MI (US); Nolan R. Pilarz, Walker, MI (US)

(73) Assignee: Dematic Corp., Grand Rapids, MI (US)

( * ) Notice: Subject to any disclaimer, the term of this patent is extended or adjusted under 35 U.S.C. 154(b) by 98 days.

(21) Appl. No.: 14/474,819

(22) Filed: Sep. 2, 2014

(65) Prior Publication Data

US 2015/0068875 A1    Mar. 12, 2015

Related U.S. Application Data

(60) Provisional application No. 61/875,161, filed on Sep. 9, 2013.

(51) Int. Cl.
*B65G 47/52* (2006.01)
*B65G 47/53* (2006.01)
(Continued)

(52) U.S. Cl.
CPC ........... *G06Q 10/08* (2013.01); *B65G 1/1378* (2013.01)

(58) Field of Classification Search
None
See application file for complete search history.

(56) References Cited

U.S. PATENT DOCUMENTS 5,860,784 A * 1/1999 Schuitema ........... B65G 1/0407
414/280
6,736,254 B1 * 5/2004 Fortenbery ........... B65G 47/962
198/370.03
(Continued)

FOREIGN PATENT DOCUMENTS

DE       10340143 A1   3/2005
GB        2366561 A    3/2002
(Continued)

OTHER PUBLICATIONS

International Search Report (Form PCT/ISA/210) and Written Opinion of the International Searching Authority (Form PCT/ISA/237) from corresponding Patent Cooperation Treaty Application No. PCT/US2014/053829, mailed Dec. 30, 2014.
(Continued)

*Primary Examiner* — Kavel Singh
(74) *Attorney, Agent, or Firm* — Gardner, Linn, Burkhart & Flory, LLP

(57) ABSTRACT

A material-handling system and method includes at least one first processing station, each having an input and an output. A linear transfer system made up of a plurality of transfer units that travel in unison in a linear motion past the input and output of the first processing station(s) either receives articles from the output and discharges articles to the input or transfers articles between the first processing station and a second processing station. A control sequences articles between the transfer units and the first input and output or between the first processing station and a second processing station in a manner that enhances operation of the processing station(s).

24 Claims, 8 Drawing Sheets

(51) Int. Cl.
*B65G 43/08* (2006.01)
*B65G 17/42* (2006.01)
*B65G 17/32* (2006.01)
*G06Q 10/08* (2012.01)
*B65G 1/137* (2006.01)

(56) References Cited

U.S. PATENT DOCUMENTS

| | | | | |
|---|---|---|---|---|
| 6,811,018 B2 * | 11/2004 | Cotter | ................... | B65G 15/22 |
| | | | | 198/460.1 |
| 6,820,561 B2 * | 11/2004 | Soldavini | ............ | B65G 17/345 |
| | | | | 104/88.03 |
| 7,093,709 B2 | 8/2006 | Cotter et al. | | |
| 7,556,144 B2 | 7/2009 | Cotter et al. | | |
| 7,853,371 B2 | 12/2010 | Koide | | |
| 8,113,334 B2 * | 2/2012 | Layne | ....................... | B07C 3/08 |
| | | | | 198/348 |
| 8,713,889 B2 | 5/2014 | Buttner et al. | | |
| 2006/0182543 A1 | 8/2006 | Schaefer | | |
| 2008/0014060 A1 | 1/2008 | Schaefer | | |
| 2009/0324378 A1 | 12/2009 | Schaefer | | |
| 2010/0300048 A1 | 12/2010 | Krizmanic et al. | | |
| 2011/0008137 A1 * | 1/2011 | Yamashita | ........... | B65G 1/0492 |
| | | | | 414/267 |
| 2014/0014468 A1 | 1/2014 | Pilarz et al. | | |

FOREIGN PATENT DOCUMENTS

| | | |
|---|---|---|
| JP | 2013079126 A | 5/2013 |
| WO | 2010076821 A1 | 7/2010 |
| WO | 2012085271 A1 | 6/2012 |

OTHER PUBLICATIONS

International Preliminary Report on Patentability from corresponding Patent Cooperation Treaty Patent Application No. PCT/US2014/053829 mailed Mar. 24, 2016.

* cited by examiner

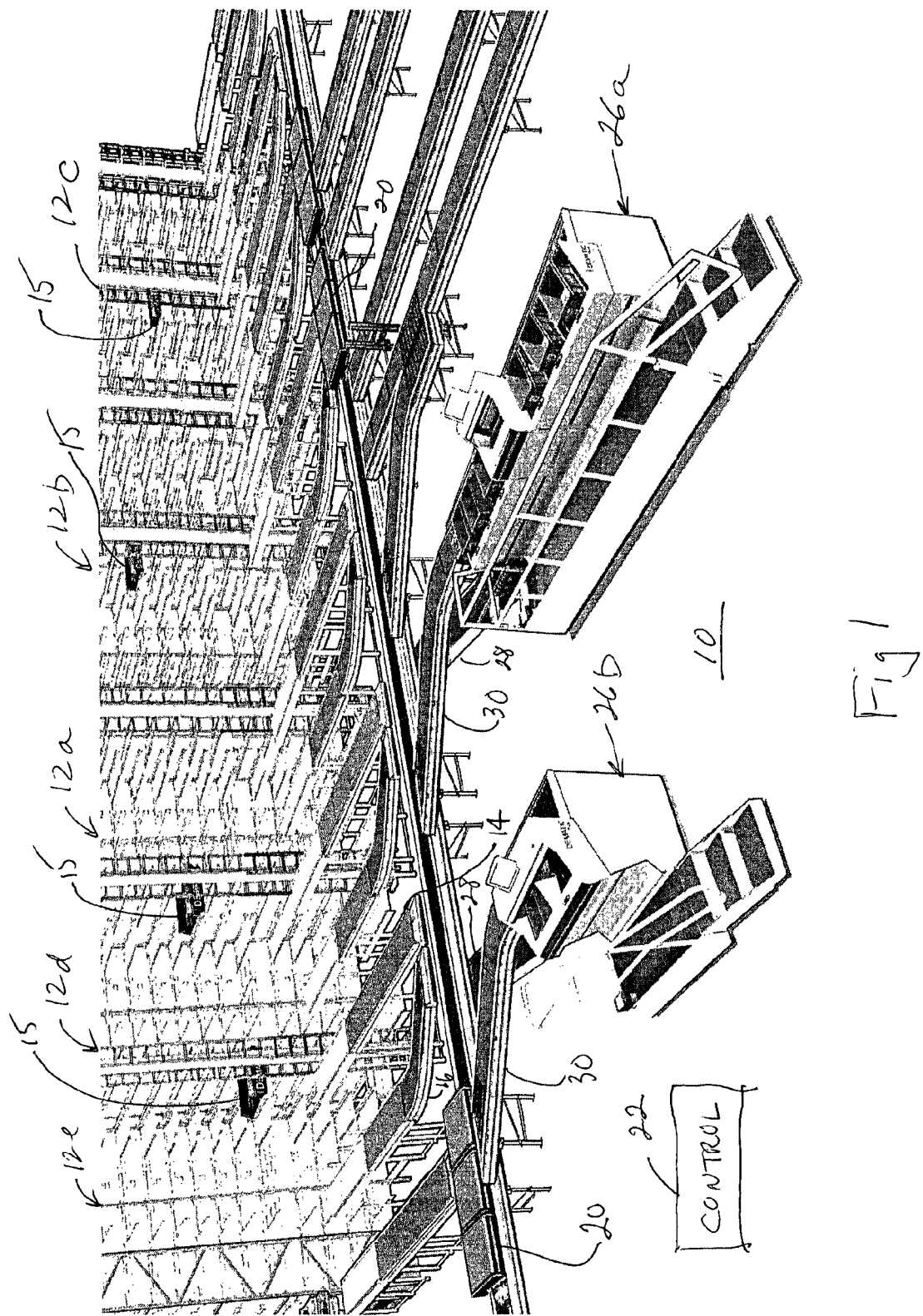

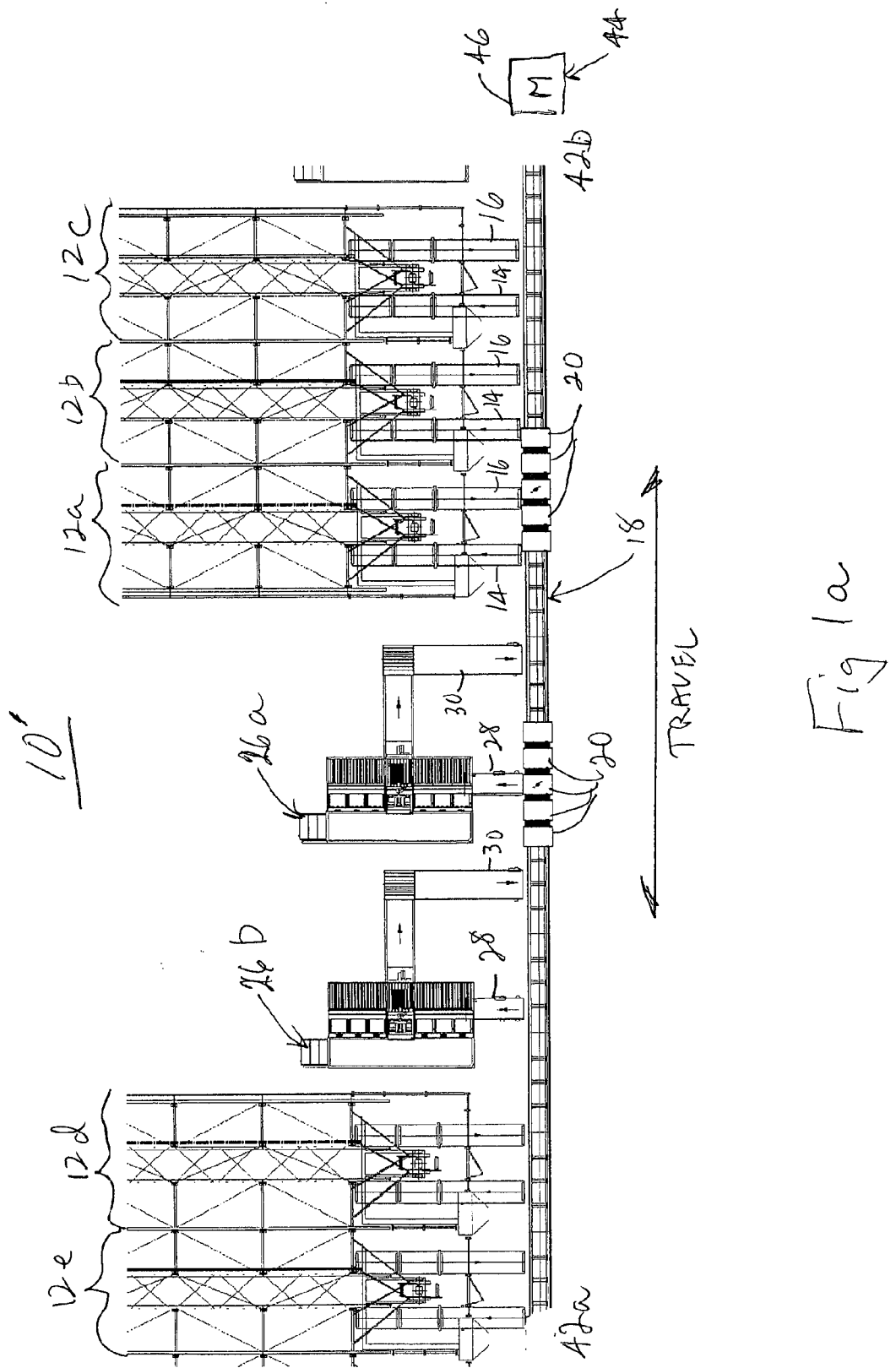

TRANSFER SYSTEM AND MATERIAL-HANDLING SYSTEM AND METHOD USING SUCH TRANSFER SYSTEM

CROSS REFERENCE TO RELATED APPLICATION

This application claims priority from U.S. patent application Ser. No. 61/875,161, filed on Sep. 9, 2013, the disclosure of which is hereby incorporated herein by reference.

BACKGROUND OF THE INVENTION

The present invention is directed to a material-handling system and method for handling articles, such as cases or articles, split cases of articles, totes of individual articles, and the like and, in particular, to a transfer system for use with such material-handling system.

Material-handling systems tend to develop "pinch points" which are locations that tend to slow the flow of articles because articles need to be retrieved in proper sequencing for further processing. While various buffer systems are used to reduce such pinch-points, it is possible for pinch-points to develop within the buffer system itself.

SUMMARY OF THE INVENTION

The present invention is directed to a transfer system and method that reduces work flow pinch-points in material-handling systems and thereby enhances the efficiency of operation of the material-handling system. Also, multiple material-handling systems can be coupled together in a manner that allows articles to be transferred, by way of example, from a storage-processing station to an order assembly processing station without the need for extensive conveyors with sortation capability. Other uses and advantages will become apparent to the skilled artisan upon understanding the nature of the various embodiments of the present invention disclosed herein.

A material-handling system and method, according to an aspect of the invention, is useful with a first processing station having a first article input and a first article output. A transfer system between at least the inputs and the output includes a track and a plurality of transfer units travelling along the track. A propulsion system drives the transfer units reciprocally along the track past the input and output. Each of said transfer units has a support surface that is configured to support articles and a transfer for transferring articles to and from the support surface transversely of the track. A control controls the transfers to selectively receive articles from the output and to discharge articles to the input as the transfer units pass the output and the input in order to sequence articles.

The system may include a second processing station having a second article input and a second article output and the control controlling the transfers to selectively receive articles from the second article output and to discharge articles to the second article input as the transfer units pass the second input and said second output in order to sequence articles between said first and second processing stations. The transfer units may include cross belt units each having a conveying surface that provides both the support surface and the transfer mechanism. The conveying surface may be defined by an endless belt that is driven by a motorized roller. The endless belt may have a low modulus of elasticity.

The first processing station may include a three-dimensional warehouse having stacked racks, an elevator that is adapted to store articles to levels of the racks and retrieves articles from the levels of the racks and a plurality of shuttles that transfer articles between the elevator and the racks. The first article input supplies articles to the elevator and the first article output discharges articles from the elevator. The second processing station may be a goods-to-person pick station. The second article input supplies totes of goods to an operator and the second article output retrieves totes of goods from the operator. The first processing station may be located at one lateral side of the linear transfer system and the second processing station located at an opposite lateral side of said linear transfer system.

The transfer units may travel in unison, such as in a continuous motion between opposite ends of the track. The transfer units may be interconnected in a train. A propulsion system may be provided to move the transfer units in a regular motion. The propulsion system may be a servo motor. The servo motor may travel with the transfer units or be stationary and interconnected with the transfer units by a connection member, such as a belt.

A material-handling system and method, according to an aspect of the invention, includes at least one processing station, each having an input and an output. A linear transfer system made up of a plurality of transfer units that travel in unison in a linear motion past the input and output of the first processing station(s). The transfer units each have an article support surface and a transfer receives articles to the support surface from the output and discharges articles from the support surface to the input. A control sequences articles between the transfer units and the first inputs and outputs in a manner that enhances operation of the processing station(s). Where multiple processing stations are used, load balancing of the stations may be carried out. Where first and second different types of processing stations are used, articles may be sequenced between the processing stations with little or no conveyors or sorters.

These and other objects, advantages and features of this invention will become apparent upon review of the following specification in conjunction with the drawings.

BRIEF DESCRIPTION OF THE DRAWINGS

FIG. 1 is a perspective view of a material-handling system, according to an embodiment of the invention;

FIG. 1a is a top plan view of the material-handling system in FIG. 1 with a different physical arrangement of the processing stations;

DESCRIPTION OF THE PREFERRED EMBODIMENT

Figure 2:
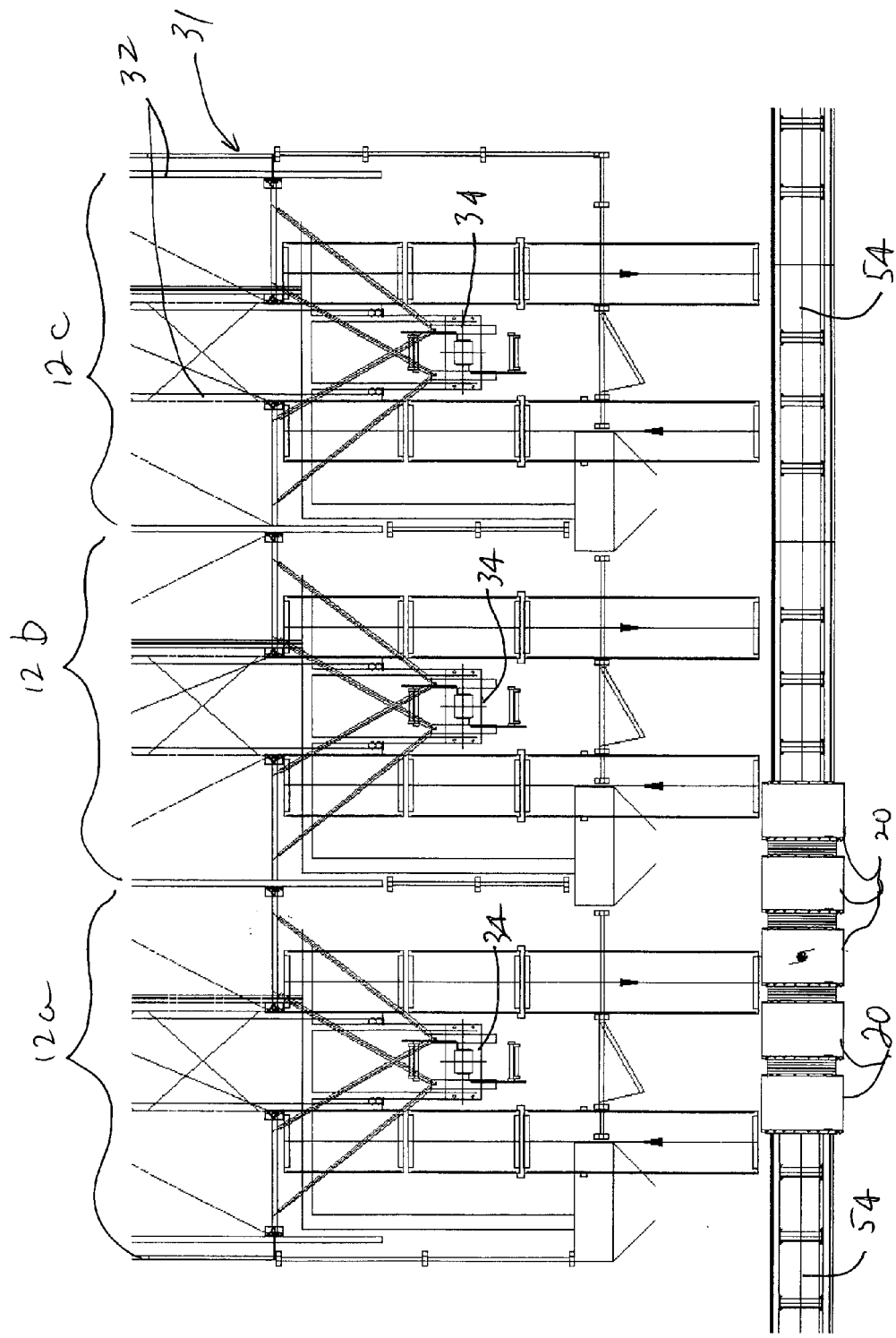
FIG. 2 is a top plan view of a plurality of first processing stations and a portion of a linear transfer system of the material-handling system in FIG. 2.
Figure 3:
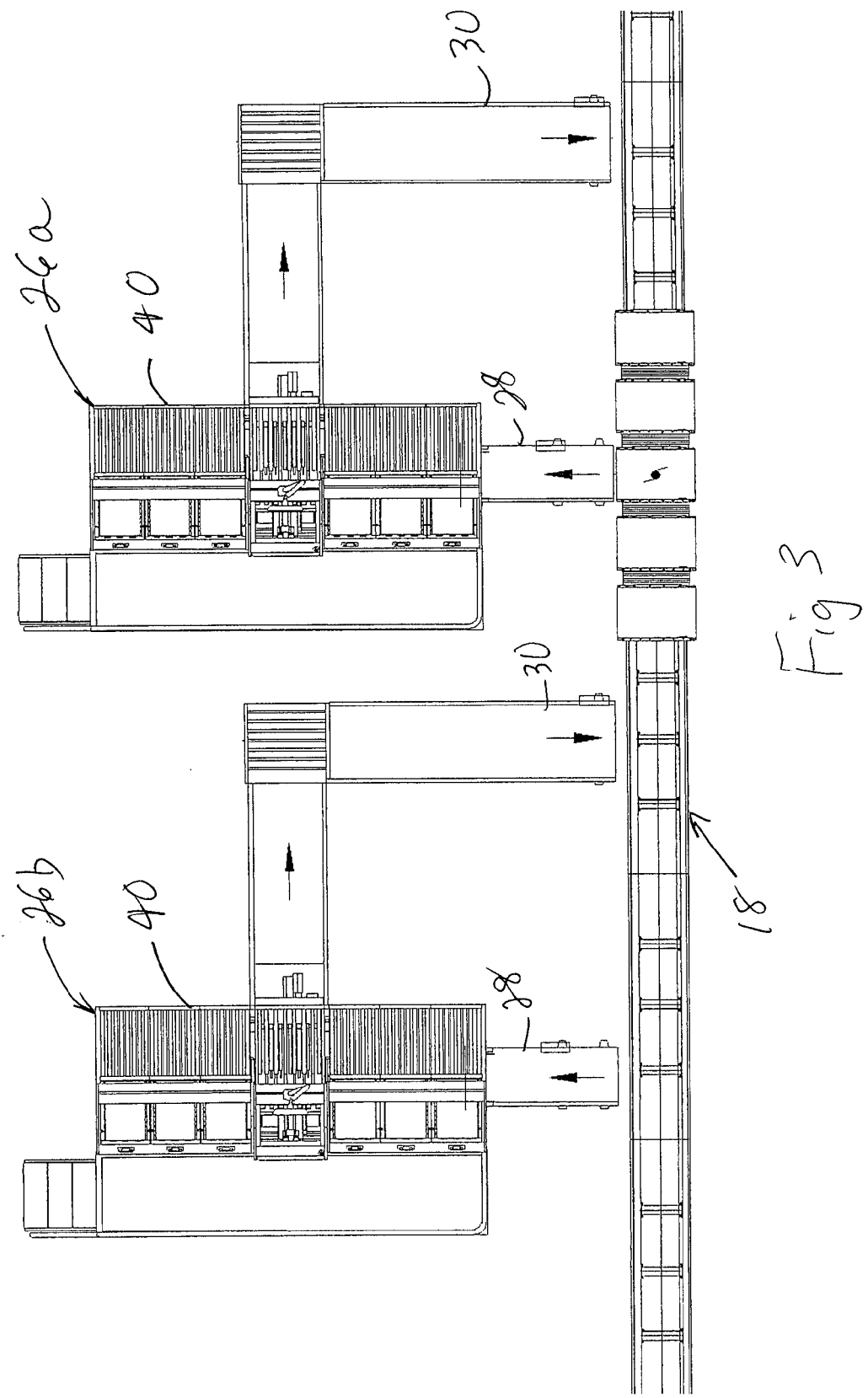
FIG. 3 is a top plan view of a plurality of second processing stations and another portion of a linear transfer system of the material-handling system in FIG. 2.
Figure 4:
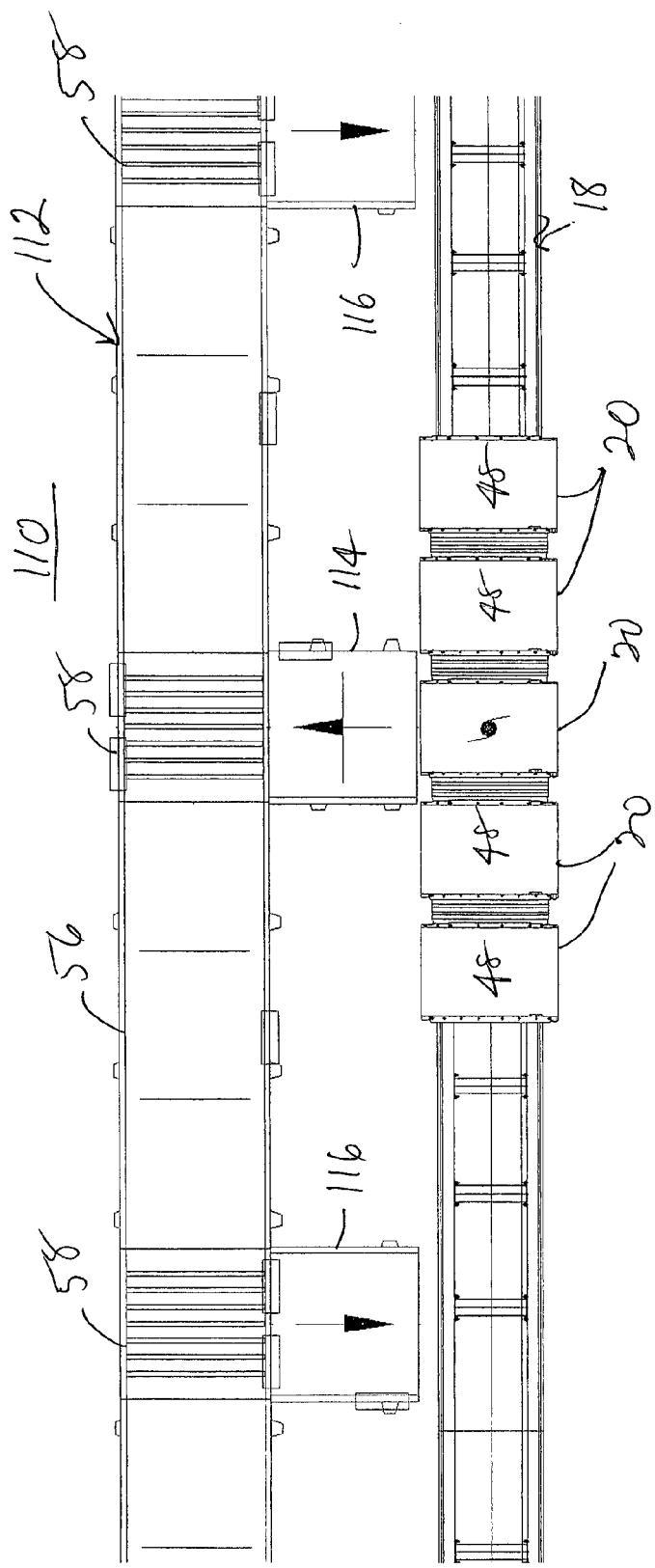
FIG. 4 is a top plan view of a material-handling system according to an alternative embodiment of the invention.
Figure 5:
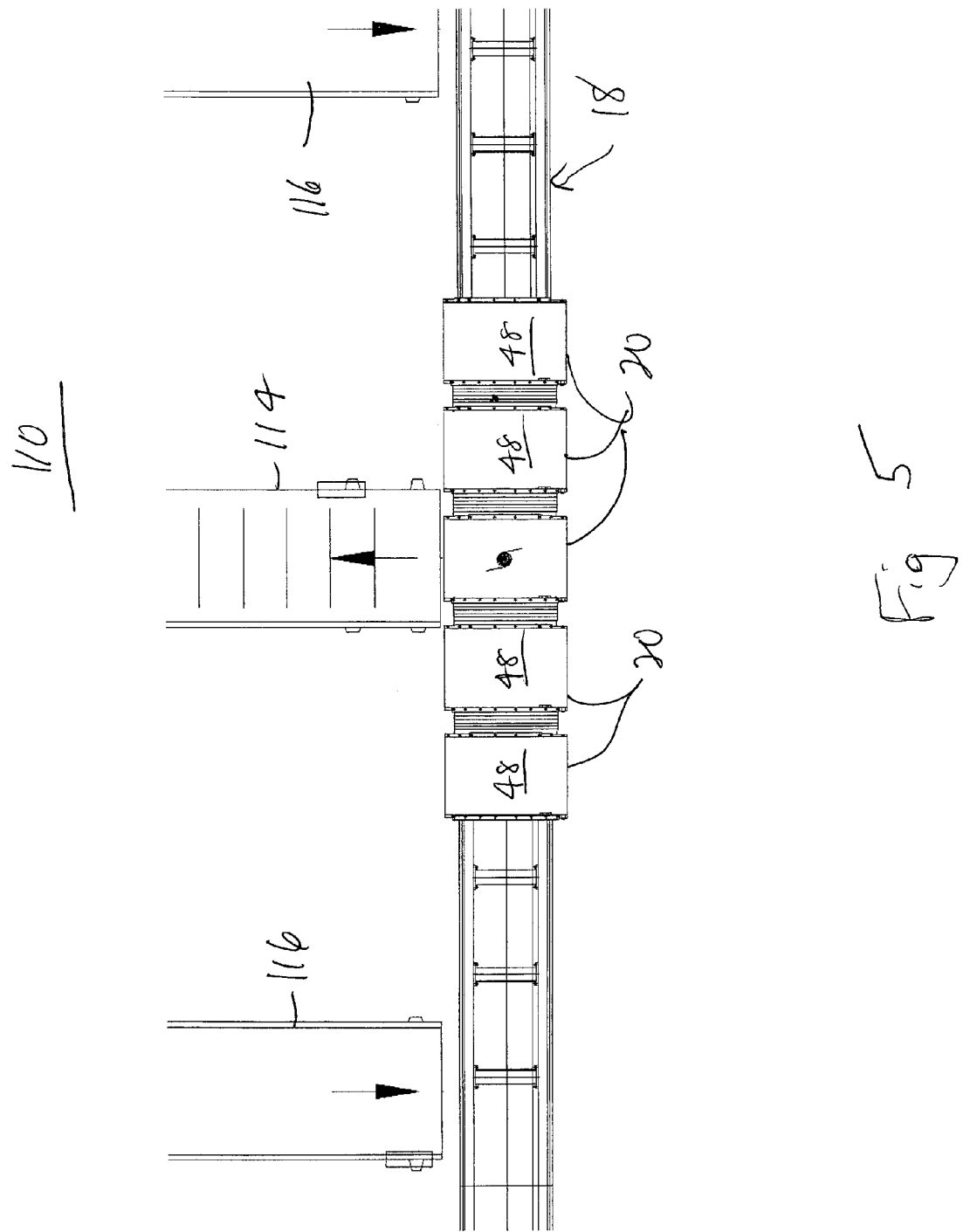
FIG. 5 is an enlarged top plan view of a linear transfer system of the material-handling system in FIG. 4.
Figure 6:
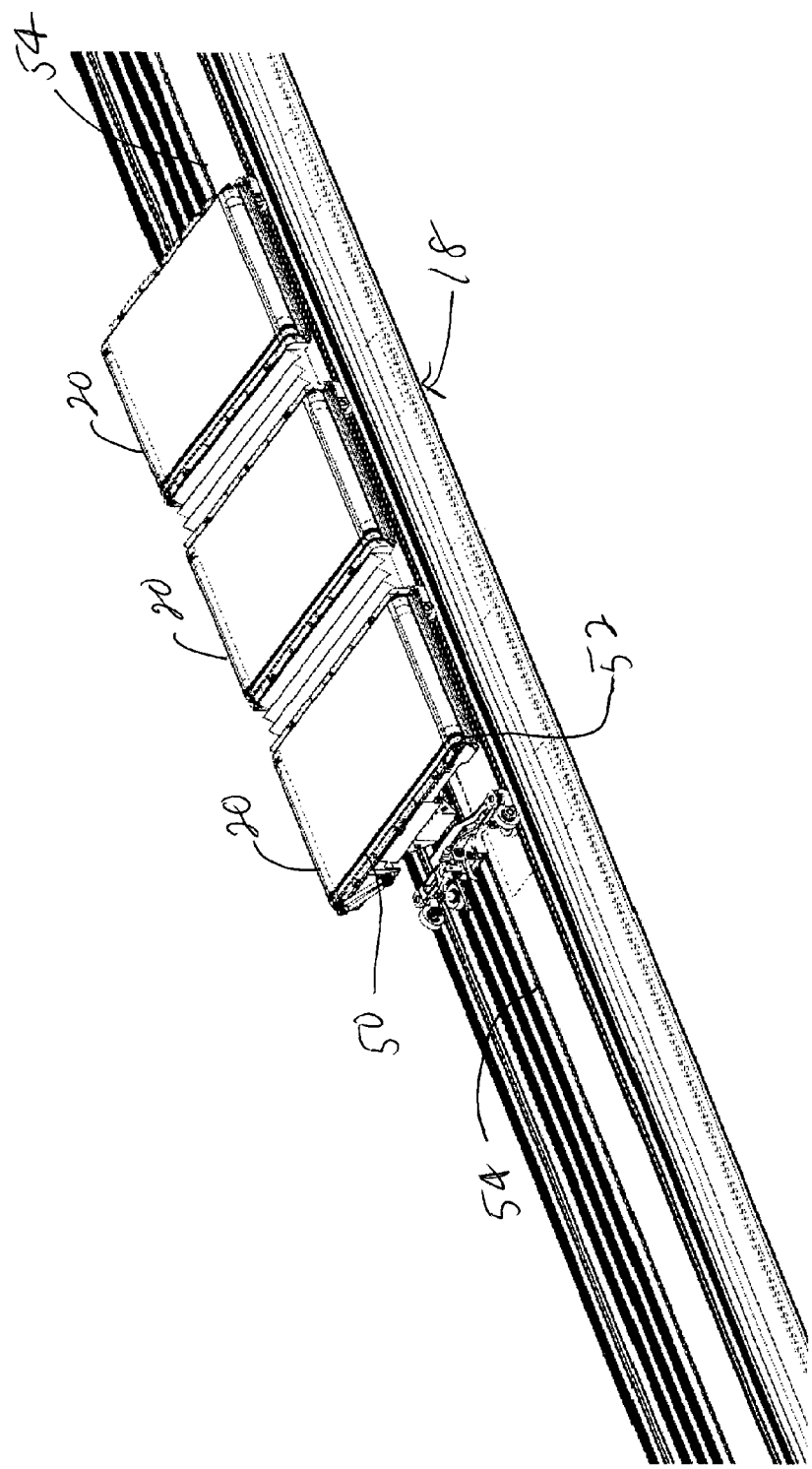
FIG. 6 is a perspective view of a portion of a linear transfer system.
Figure 7:
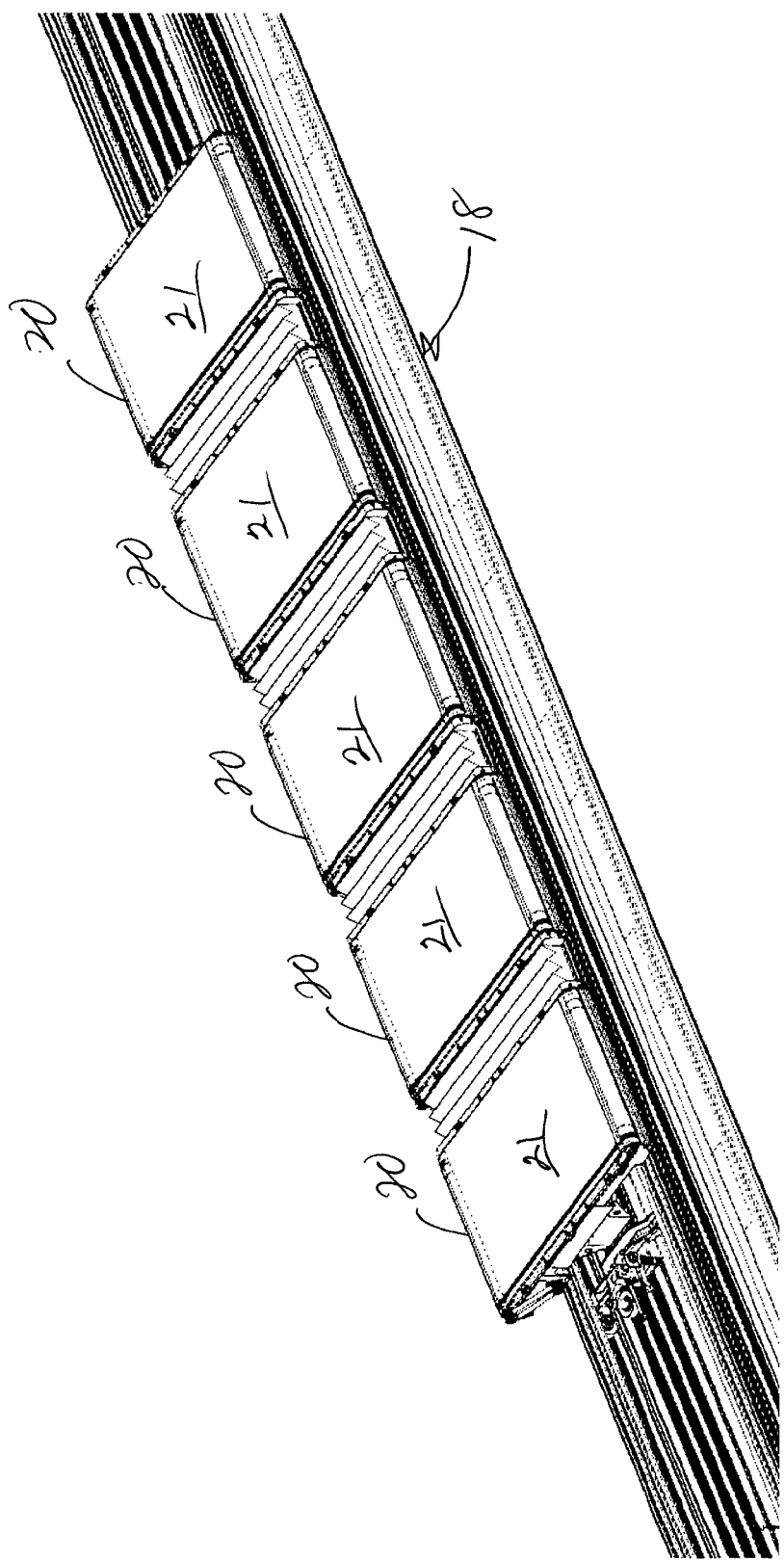
FIG. 7 is the same view as FIG. 6 of an alternative embodiment thereof.

Referring now to the drawings and the illustrative embodiments depicted therein, a material-handling system 10 includes a plurality of first processing stations 12, referred to as stations 12a, 12b, 12c, 12d . . . 12n (FIGS. 1 and 2) and second processing stations 26, referred to as stations 26a, 26b . . . 26n. A material-handling system 10' is generally the same as system 10 except that the processing stations 12, 26 have a different physical layout from material-handling system 10. Each processing station 12 has a first input 14 that is configured to receive articles and a first output 16 that is configured to discharge articles from the respective processing station. For example, if first processing stations 12 are article storage systems, then first input 14 is for supplying articles to be stored in the storage system and first output 16 is for discharging articles from the storage system.

Material-handling system 10, 10' further includes a linear transfer system 18 made up of a plurality of transfer units 20 at least some of which travel in unison in a linear motion past first inputs 14 and first output 16 of processing station 12. Transfer units 20 each have an article support surface 21 that is configured to support articles and a transfer unit that is configured to receive articles to support surface 21 from first outputs 16 and discharge articles from support surface 21 to first inputs 14. A control 22 controls operation of transfer units 20, inputs 14, outputs 16 to sequence articles between the transfer units and first inputs 14 and first outputs 16 in a manner that either enhances operation of each processing station 12, such as by balancing loads between the processing stations or sequencing articles between first processing stations 12 and second processing stations 26. For example, in the illustrated embodiment, each processing station 12 is a three-dimensional warehouse 31 having stacked racks 32, a lift, or elevator, 34 that lifts articles from first input 14 to particular levels of the racks 32 and retrieves articles from the levels of the racks and discharges the retrieved articles to output 16. Each processing station further includes a plurality of shuttles 15 that transfer articles between lift 34 and racks 32. An example of such a three-dimensional warehouse is disclosed in United States Patent Application Publication No. 2011/0008137 A1, the disclosure of which is hereby incorporated herein by reference.

Three-dimensional warehouses 31 traditionally retrieve articles in a particular sequence by lift 34 going to a particular level and receiving an article pulled from a storage location on that level by a shuttle. The lift then discharges the article to output 16. Linear transfer system 18 may be controlled in a fashion to receive the articles from output 16 as each transfer unit 20 passes that output according to a sequence in which the article is needed, for example to fill an order, or the like. Transfer units travel in a regular motion between opposite ends 42a and 42b of liner transfer system 18. Therefore, articles can be loaded to transfer units 20 each time that the transfer units pass output 16 to thereby arrange the articles on transfer units 20 according to a desired sequence. Because the sequencing of articles can be performed by transfer system 18, lift 34 can retrieve articles from various levels of stacked racks 32 without regard to the sequence in which the articles need to be arranged on transfer units 20. This allows lift 34, and, hence, the processing station 12, to be operated more efficiently. In a similar fashion, articles may be discharge from transfer units 20 according to a sequence that would be more efficient for operation of lift 34 to put the articles on stacked racks 32 without regard to the arrangement of articles on transfer units 20 because articles can be discharged from each transfer unit independently as that transfer unit passes input 14.

The first processing station may alternatively be an automated storage and retrieval system (ASRS) having stacked racks, a vertically oriented mast that travels horizontally between said racks and an article handler that travels vertically along the mast. The article handler stores articles to particular locations in the racks and retrieves articles from racks. In such ASRS, first input 14 supplies articles to the article handler and first output 16 discharges articles from the article handler. Other examples of a first processing station will be apparent to the skilled artisan.

It should be understood that each input 14 is capable of receiving an article from any transfer unit 20 as that transfer unit passes input 14 and each output 16 is capable of loading an article to any unoccupied transfer unit 20 as that transfer unit passes output 16. This is possible in the illustrated embodiment because transfer units 20 travel in unison in a linear motion between opposite ends 42a, 42b of linear transfer system 18 in a regular motion. A propulsion system 44 to move the transfer units in such regular motion may be a servo motor that may travel with said transfer units 20, or may be a stationary unit, such as a servo motor that propels transfer units 20 by a cable or belt 54 reeved between the transfer units and the stationary servo motor. Other types of propulsion systems are possible, such as linear motors, traction motors, or the like.

Transfer units 20 are mechanically coupled together in a train of transfer units and thereby travel in unison. Each transfer unit 20 includes a conveying surface 48 that provides article support surface 21, which travels in a bidirectional motion transverse to the motion of said transfer units 20 to provide the function of transferring articles to and from article support surface 21. In this fashion, control 22 causes an article to be loaded to the support surface 21 of a transfer unit 20 by moving the conveying surface 48 for that transfer unit in the direction toward that transfer unit as that transfer unit passes a particular output 16 and causes an article to be discharged from a transfer unit by moving the conveying surface for that transfer unit in the opposite direction away from that transfer unit as that transfer unit passes a particular input 14. In the illustrated embodiment, this is accomplished by a non-stop reciprocating motion of transfer units 20 moving in unison between end portions 42a and 42b. However, it should be understood that it would be possible to sequence the linear motion of the transfer units to momentarily stop while aligning with a particular transfer unit with a particular input or output as needed for sequencing of the article to or from that transfer unit. However, that places more demands on propulsion system 44.

Conveying surfaces 48 are each operated by a motor driven roller 52 and are defined by an endless belt 50 that is propelled by motor driven roller 52 as roller 52 is operated in one of two opposite directions of rotation. In the illustrated embodiment, endless belt 50 has a low modulus of elasticity as disclosed in commonly assigned U.S. Pat. Nos. 6,811,018; 7,093,709 and 7,556,144, the disclosures of which are hereby incorporated herein by reference. Other endless belts may be used and driven by a conventional motor. Also, conveying surface 48 may be defined by powered rollers. Each transfer unit 20 may be of the type used in a conventional cross-belt sorter and may have the features disclosed in commonly assigned U.S. Pat. Application Publication No. 2014/0014468 A1, published Jan. 16, 2014, entitled CROSSBELT SORTER SYSTEM AND METHOD OF SORTING ARTICLES, the disclosure of which is hereby incorporated herein by reference.

In addition to facilitating a more efficient operation of each processing station 12, where a plurality of processing stations are included in material-handling system 10, each having a first input 14 and a first output 16, control 22 may be further programmed to sequence articles between transfer units 20 and the first inputs and first outputs of the multiple processing stations 12 in a manner that balances load between the processing stations. This allows the processing stations to each have less storage capacity because the storage capacity of each can be more efficiently utilized as a system.

Material-handling system 10 includes at least one, and illustrated with multiple, second processing stations 26 (26a, 26b . . . 26n), each having a second input 28 and a second output 30. Transfer units 20 also travel in unison past second inputs 28 and second outputs 30 and are capable of receiving articles from second output 30 and discharge articles to second inputs 28. Control 22 is further adapted to sequence articles between transfer units 20 and second inputs 28 and second outputs 30 in a manner that enhances operation of each second processing station. In the illustrated embodiment, second processing stations 26 are goods-to-person pick and put stations of the type disclosed in commonly assigned U.S. Pat. No. 8,713,889 B2, the disclosure of which is hereby incorporated herein by reference. Transfer system 18 can enhance operation of second processing stations 26, such as by sequencing supply totes of articles and/or order totes of articles to and from the station. Second input 28 supplies totes of articles to an operator and second output 30 retries totes of articles from the operator. Where a plurality of second processing stations 26 are used, loading between the second processing stations can be balanced by supplying orders to processing stations that are more lightly loaded. While second processing stations 26 are illustrated as goods-to-person stations, they could be manual put-walls or another downstream operation. Transfer system 18 can also be used to transfer articles, such as totes or other forms of containers, between a first processing station 12 when needed by a second processing station 26 and returned to first processing station 12 when finished processing by a second processing station. In this matter, totes or containers can be efficiently transported and sequenced between processing stations 12, 26 to both enhance the efficiency of the system while minimizing conveyors and sorters. Also, material-handling choke points are reduced in a manner that will be apparent to the skilled artisan.

An alternative embodiment of a material-handling system 110 includes a processing station 112 in the form of a conveyor 56 with multiple right-angle transfers 58, each connecting an input 114 or output 116 with a linear transfer system 18. Linear transfer system 18 utilizes the previously described functions to rearrange articles on conveyor 56 in cooperation with inputs 114, outputs 116 and transfers 58. Other examples with be apparent to the skilled artisan.

While the foregoing description describes several embodiments of the present invention, it will be understood by those skilled in the art that variations and modifications to these embodiments may be made without departing from the spirit and scope of the invention, as defined in the claims below. The present invention encompasses all combinations of various embodiments or aspects of the invention described herein. It is understood that any and all embodiments of the present invention may be taken in conjunction with any other embodiment to describe additional embodiments of the present invention. Furthermore, any elements of an embodiment may be combined with any and all other elements of any of the embodiments to describe additional embodiments.

The embodiments of the invention in which an exclusive property or privilege is claimed are defined as follows:

1. A material-handling system, comprising:
a first processing station having a first article input and a first article output;
a transfer system between at least said first article input and said first article output, said transfer system comprising a track, a plurality of transfer units travelling along said track and a propulsion system driving said transfer units reciprocatingly along said track in a regular motion between opposite ends of said track past said input and output, each of said transfer units having a bidirectional conveying surface that is oriented perpendicular to said track thereby providing an article support surface that is configured to support articles and to transfer articles to and from that article support surface transversely of said track; and
a control, said control controlling said bidirectional conveying surfaces of said transfer units and said first article input and said first article output to selectively receive an article from said first article output to one of said bidirectional conveying surfaces as that conveying surface travels past said first article output and to discharge an article from one of said bidirectional conveying surfaces to said first article input as that transfer unit travels past said first article input in order to sequence articles between said first article input and said first article output.

2. The material-handling system as claimed in claim 1 wherein said transfer units comprise cross belt units defining said bidirectional conveying surfaces.

3. The material-handling system as claimed in claim 2 wherein said bidirectional conveying surfaces are each defined by an endless belt that is driven by a motorized roller.

4. The material-handling system as claimed in claim 3 wherein said endless belt has a low modulus of elasticity.

5. The material-handling system as claimed in claim 1 wherein said first processing station comprises a three-dimensional warehouse having stacked racks, an elevator that is adapted to store articles to levels of the racks and retrieves articles from the levels of the racks and a plurality of shuttles that transfer articles between the elevator and the racks, wherein said first article input supplies articles to said elevator and said first article output discharges articles from said elevator.

6. The material-handling system as claimed in claim 1 wherein said transfer units travel in unison in a continuous motion between opposite ends of said track.

7. The material-handling system as claimed in claim 6 wherein said transfer units are interconnected in a train.

8. The material-handling system as claimed in claim 6 including a propulsion system to move said transfer units in said regular motion, said propulsion system comprising a servo motor.

9. The material-handling system as claimed in claim 8 wherein said servo motor travels with said transfer units.

10. The material-handling system as claimed in claim 8 wherein said servo motor is stationary.

11. A material-handling system, comprising:
a first processing station having a first article input and a first article output;
a second processing station having a second article input and a second article output;
a transfer system between at least said first article input and said first article output and said second article input and said second article output, said transfer system comprising a track, a plurality of transfer units travelling along said track and a propulsion system driving said transfer units reciprocatingly along said track in a regular motion between opposite ends of said track past said first article input, said first article output, said second article input and said second article input, each of said transfer units having a bidirectional conveying surface that is oriented perpendicular to said track thereby providing an article support surface that is configured to support articles and to transfer articles to and from that article support surface transversely of said track; and a control, said control controlling said bidirectional conveying surfaces of said transfer units and said first article input, said first article output, said second article input and said second article output to selectively receive articles from said first article output or said second article output to one of said bidirectional conveying surfaces as that conveying surfaces travels past said first article output or said second article output and to discharge articles from one of said bidirectional conveying surfaces to said first article input or said second article input as that transfer unit travels past said first article input or said second input in order to sequence articles between said first and second processing stations.

12. The material-handling system as claimed in claim 11 wherein said second processing station comprises a goods-to-person pick station wherein said second article input supplies containers of goods to an operator and said second article output retrieves containers of goods from the operator.

13. The material-handling system as claimed in claim 11 wherein said first processing station comprises a three-dimensional warehouse having stacked racks, an elevator that is adapted to store articles to levels of the racks and retrieves articles from the levels of the racks and a plurality of shuttles that transfer articles between the elevator and the racks, wherein said first article input supplies articles to said elevator and said first article output discharges articles from said elevator and wherein said second processing station comprises a goods-to-person pick station, wherein said second article input supplies containers of goods to an operator and said second article output retrieves containers of goods from the operator.

14. The material-handling system as claimed in claim 11 wherein said first processing station is located at one lateral side of said linear transfer system and said second processing station is located at an opposite lateral side of said linear transfer system.

15. The material-handling system as claimed in claim 11 wherein said transfer units comprise cross belt units defining said bidirectional conveying surfaces.

16. The material-handling system as claimed in claim 15 wherein said bidirectional conveying surfaces are each defined by an endless belt that is driven by a motorized roller.

17. The material-handling system as claimed in claim 16 wherein said endless belt has a low modulus of elasticity.

18. The material-handling system as claimed in claim 11 wherein said first processing station comprises a three-dimensional warehouse having stacked racks, an elevator that is adapted to store articles to levels of the racks and retrieves articles from the levels of the racks and a plurality of shuttles that transfer articles between the elevator and the racks, wherein said first article input supplies articles to said elevator and said first article output discharges articles from said elevator.

19. The material-handling system as claimed in claim 11 wherein said transfer units travel in unison in a continuous motion between opposite ends of said track.

20. The material-handling system as claimed in claim 19 wherein said transfer units are interconnected in a train.

21. The material-handling system as claimed in claim 19 including a propulsion system to move said transfer units in said regular motion, said propulsion system comprising a servo motor.

22. The material-handling system as claimed in claim 21 wherein said servo motor travels with said transfer units.

23. The material-handling system as claimed in claim 21 wherein said servo motor is stationary.

24. A material-handling method for use with a first processing station having a first article input and a first article output and a second processing station having a second article input and a second article output; said method comprising:

propelling a plurality of transfer units reciprocatingly along a track in a regular motion between opposite ends of said track past said inputs and outputs, each of said transfer units having a bidirectional conveying surface that is oriented perpendicular to said track thereby providing an article support surface that is configured to support articles and to transport articles to and from that transfer unit transversely of said track; and controlling said bidirectional conveying surfaces of said transfer units and said first article input, said first article output, said second article input and said second article output to selectively receive an article from one of said outputs to one of said bidirectional conveying surfaces as that conveying surface travels past said first article output or said second article output and to discharge that article from one of said bidirectional conveying surfaces to said first article input or said second article input as that transfer unit travels past said first article input or said second article input in order to sequence articles between said first and second processing stations.

* * * * *